Feb. 26, 1946. J. G. O'NEIL ET AL 2,395,754
METHOD OF MAKING CONTAINERS
Original Filed May 10, 1940 4 Sheets-Sheet 2

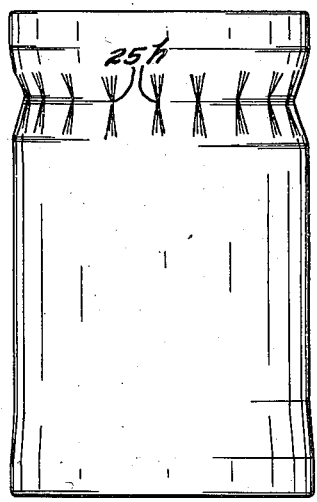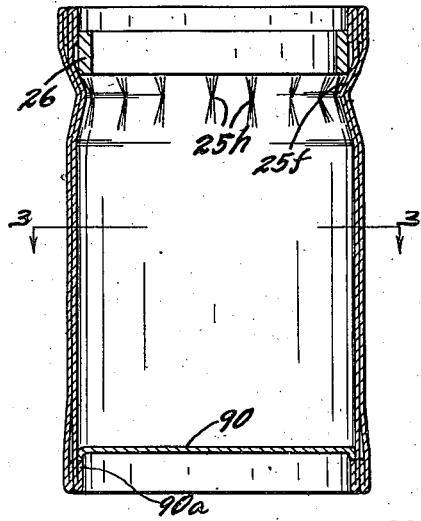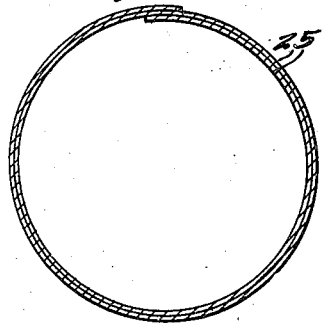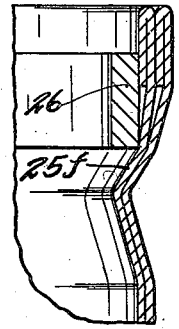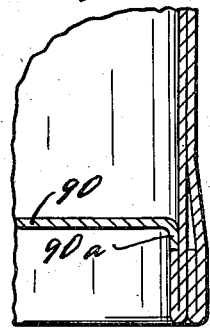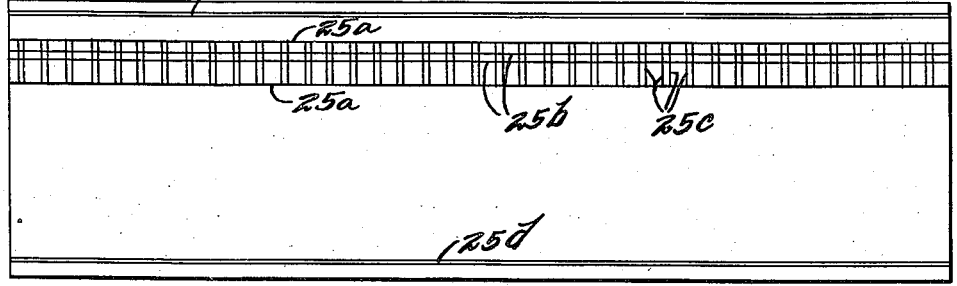

Inventors
John G. O'Neil
Lawrence G. Zesbaugh
By Chas. C. Reff
Attorney

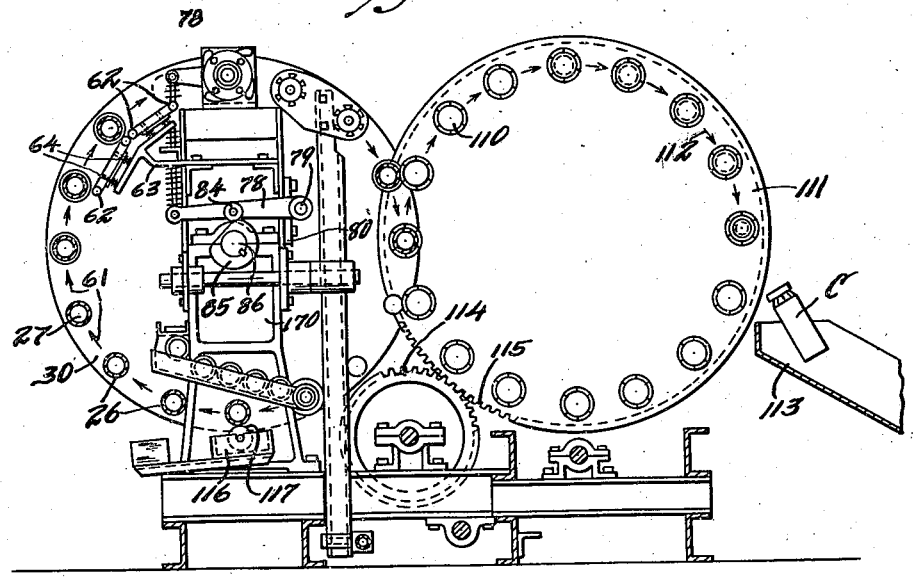

Feb. 26, 1946. J. G. O'NEIL ET AL 2,395,754
METHOD OF MAKING CONTAINERS
Original Filed May 10, 1940 4 Sheets-Sheet 4

Inventors
John G. O'Neil
Lawrence G. Zesbaugh
By Chas. E. Reif
Attorney

Patented Feb. 26, 1946

2,395,754

UNITED STATES PATENT OFFICE 2,395,754

METHOD OF MAKING CONTAINERS

John G. O'Neil, Faribault, and Lawrence G. Zesbaugh, Minneapolis, Minn., assignors, by mesne assignments, to Carl Weinhagen, Jr., St. Paul, Minn.

Original application May 10, 1940, Serial No. 334,384. Divided and this application September 24, 1943, Serial No. 503,676

9 Claims. (Cl. 93—39.1)

This invention relates to a container and particularly to a novel method of making a container. While the invention might be applicable to various types of containers in the embodiment of the invention illustrated, it is shown applied to a container in general tubular form.

With the increasing dispensing of liquids including milk, powders and other substances in containers, it is desirable to have a simple and inexpensive form of container in which liquids and other substances may be packed and dispensed, which container should be of rugged and strong structure.

It is an object of this invention to provide a simple and efficient method of forming a container of general tubular form.

It is further an object of the invention to provide a simple and efficient method of forming a container of general tubular form which consists in making or producing a rigid member having an opening therethrough which may be a ring or which may be of polygonal form, winding a sheet of flexible material about said member to form a tube and preferably securing said material to said member and subsequently placing a bottom in said tube.

It is still another object of the invention to provide a simple and efficient method of forming a container of general tubular form which consists in providing a substantially rigid member having an opening therethrough such as a ring, winding a sheet of flexible material about said ring to form a tube, crimping said tube at one side of said ring to reduce the diameter of said tube and placing a bottom in one end of said tube.

It is also an object of the invention to provide a simple and efficient method of forming a container of general tubular form which consists in providing a ring of substantially rigid material, such as a ring of paper or cardboard, winding a sheet of flexible material such as stiff paper about said ring in a plurality of layers to form a tube and preferably securing said material to said ring, crimping said tube to reduce the diameter thereof at one side of said ring and thus form a shoulder against which said ring may seat and placing a bottom in one end of said tube.

It is still further an object of the invention to provide a method such as set forth in the preceding paragraphs in which said blank is preferably provided with a multiplicity of scores extending substantially at right angles to one longitudinal edge of said blank, said crimping being done in the zone of said scores, whereby said scores intermittently form crimps or pleats and also preferably scoring said blank along lines adjacent the longitudinal edges thereof so that it may be folded over on said last mentioned scores.

These and other objects and advantages of the invention will be fully set forth in the following description made in connection with the accompanying drawings in which like reference characters refer to similar parts throughout the several views and in which:

Fig. 1 is a view in side elevation of a container made by the method of the present invention;

Fig. 2 is a vertical central section through said container;

Fig. 3 is a transverse section through said container taken on line 3—3 of Fig. 2 as indicated by the arrows;

Fig. 4 is a parallel vertical section similar to Fig. 2 shown on an enlarged scale;

Fig. 5 is a partial vertical section similar to Fig. 2 showing the bottom of the container and also shown on an enlarged scale;

Fig. 6 is a plan view of the blank used in making said container;

Fig. 11 is a view partly in elevation and partly in vertical section of a portion of machine which may be used to make the container;

Fig. 12 is a view in front elevation of a portion of said machine;

Fig. 13 is a view in side elevation of the structure shown in Fig. 12;

Fig. 14 is a somewhat diagrammatic view illustrating the method of forming the bottom in said container;

Fig. 15 is a fragmentary view of a portion of apparatus for applying adhesive to secure the bottom;

Figure 7:
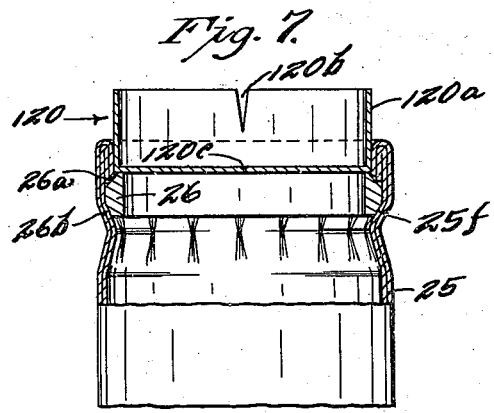
Fig. 7 is a central vertical section through the top portion of the container showing a modification.

Referring to the drawings in Fig. 6 a blank is shown and while the method of the invention could be carried out with other blanks, said blank is shown as comprising a strip 25 of flexible sheet material which may be stiff paper or similar material. When the blank and container are made from paper the stock will be suitably treated to render it suitable for the substance which the container is intended to hold. If the container is to hold liquid such as milk, the paper stock will be treated to render it water-proof. Similarly the stock could be treated to render it oil or grease-proof if the container is intended to hold lubricating oil, grease or similar substances. The blank 25 is preferably provided with pairs of longitudinal scores 25a and 25b which are suitably spaced and extend parallel to the longitudinal edges of the blank. Between the scores 25a the blank is preferably provided with a pair of scores 25b rather closely spaced and which extend substantially parallel to scores 25a. The upper score 25b is spaced a short distance from the upper score 25a and scores 25b are spaced a distance which is shown substantially the same as that between upper score 25b and the upper score 25a. Between the scores 25a the blank is preferably provided with a plurality of scores 25c preferably arranged in pairs, the scores of said pairs being slightly separated and the pairs being spaced at somewhat greater distance. The blank is also preferably provided with scores 25d which extend longitudinally of the blank, a short distance from and parallel to its longitudinal edges. Preferably the scores 25d are formed as pairs, the scores of the pairs being slightly separated. The blank 25 may be made in separate lengths each suitable for one container or it may be formed as a continuous strip from which the individual lengths will be severed as the containers are formed.

To form the container a member 26 is produced which will be made of some rigid or substantially rigid material and in practice this member has been made of stiff paper or cardboard material. While member 26 could be of polygonal shape, the same is illustrated as annular or in the form of a ring. Ring 26 as shown in Figs. 2 and 4 may be rectangular in radial cross section or it may be as shown in Figs. 7 to 10 where it is provided with beveled portions 26a and 26b at its outer side and top and bottom portions respectively. When the ring 26 has been formed the blank 25 is wrapped tightly about the ring with the ring being located adjacent one longitudinal edge of the blank. While the blank 25 could be wrapped around the ring by hand, it preferably is wrapped about the ring by machine. Such a machine constructed and arranged to form the container is disclosed and claimed in the copending application of applicant's S. N. 394,136, filed May 19, 1941. Portions of said machine are illustrated in this application in connection with the description of the method.

The ring 26 may be placed upon a mandrel 27. While various types of mandrels could be used, in practice a mandrel such as illustrated in applicant's Patent 2,280,970, granted April 28, 1942, has been used. When the method is carried out in a machine the mandrels 27 may be carried on a rotating head or turret 30 which as illustrated in Fig. 11 will rotate as indicated by the arrows. The mandrel 27 with the ring thereon is brought within a broken cylindrical member or shell formed by the semi-cylindrical plate 31 carried on a portion 32a of an arm 32 which extends substantially vertically. Another plate 33 of partly cylindrical form is provided extending between certain supporting members 34. Another partly cylindrical plate 35 is provided extending between certain supporting members 36. A roller 37 has its bottom portion disposed substantially in the opening between plates 31 and 35, said roller being journalled on a stud 38 carried in a link 39, pivoted on the stud 40 secured in arm 32. Link 39 and roller 37 are resiliently supported in one direction by a compression coiled spring 41 which engages arm or link 39, said spring at its other end engaging a washer 42, in turn engaged by the head of a bolt 43 passing through link 39 and threaded into a block carried by arm 32. Another roller 45 is journalled on the stud 46 supported in members 34 and has one side extending into the space between plates 33 and 35. Another roller 47 is journalled on the stud 48 secured in a link 48' pivoted on the stud 49 carried in a vertical supporting bar 50. Link 48' is also mounted to be under resilient pressure toward plates 31 and 33 by compression coil spring 51 suitably mounted on a stud 52 extending through link 48'. One side of roller 47 is disposed in the space or opening between plates 31 and 33. The material 25e forming the blanks 25 which has been scored as described, is fed from a roll (not shown) between feed rollers 55 and 56 and between plates 57 and 58, the plate 57 having its terminal substantially in the circumference of plates 31, 33 and 35. Roller 56 may be driven by a pinion with which meshes a gear 59a which latter will be suitably driven. The mandrel 27 is positioned coaxially with plates 31, 33 and 35 and is rotated as indicated by the arrows 60 so that the material 25c is wrapped very tightly about ring 26 on the mandrel and while as many layers as desired may be used in practice, two layers of the material have been wrapped about ring 26. The blank after being wrapped about ring 26 is severed either by hand or a portion of the machine. In performing the method on the machine the turret 30 is intermittently rotated in the direction indicated by arrows 61 and the tube which has now been formed on ring 26 is moved past certain pressing and compacting rollers 62 suitably carried on a bracket 63 and resiliently pressed toward the said tube by springs 64.

The next operation performed on the tube or container body is the crimping operation. While this could be performed by hand it preferably is performed on the said machine and for this purpose the end of the tube containing ring 26 is moved into a crimping device illustrated in Figs. 12 and 13. It may be stated that the layers of material 25e are preferably coated with adhesive so that they are cemented together when wrapped about ring 26. Adhesive also is preferably applied to the periphery of ring 26 so that the layer of paper contacting said periphery will be cemented or secured to ring 26. The crimping device comprises a plurality of thin plates 68. These plates are of semi-annular form and are arranged in four sets as seen in Fig. 12. The plates of one set are disposed between the plates of the adjacent set. A bracket 69 of general right angle form is secured to the top of a bracket 70 and has a central hub 69a. A shaft 71 is journaled in hub 69a and at the forward portion thereof has secured thereto a member 72 having a rear flange portion and four projecting equally and circumferentially spaced lugs 72a. Bracket 69 also has projecting from its upstanding portion four equally and circumferentially spaced lugs 69b located on a somewhat greater radius than lugs 69a. The plates 68 are oscillatably mounted at one end on bolts 73 extending into the lugs 69b and are thus held about a stationary axis. The other ends of the plates of each set have passing therethrough screws 74 secured in the lugs 69a. A plate 75 is disposed at the outer side of plates 68, the same being of annular form and the opening therethrough being sufficiently large for the cylinder formed on the mandrel to pass therethrough. A lever arm 76 is secured to the other end of shaft 71. Lever 76 is connected by a link rod 77 to another lever 78 secured to a shaft 79 which is oscillatably mounted in a bracket 80 secured to one side of bracket 70. A lug 81 projects from one side of bracket 70 through which link rod 77 passes and a coiled compression spring 82 surrounds rod 77 bearing at one end against lever 76 and at its other end against lug 81. Another compression coiled spring 83 surrounds rod 77 bearing at its upper end against lug 81 and at its lower end against lever 78. Lever 78 intermediate its ends has secured therein a stud on which is carried a cam roller 84 disposed to engage a cam 85 secured to shaft 86.

It will be seen that when arm 76 is moved downwardly member 69 will be oscillated and the blades 68 will be swung toward the axis of shaft 71. The shape of the blades is shown in Fig. 12 where one appears in front elevation at the upper left hand corner. It will be seen that the blade has a concave semi-circular inner portion 68a. These portions in the four sets of blades form a circle. The inner edges of the blades are arranged to form an angle in cross section as indicated by the dotted lines in Fig. 13, the apex of the angle being directed toward the axis of shaft 71. The tube or container body is moved endwise into the crimping device and is moved endwise therefrom after the crimping operation.

The crimping operation reduces the diameter of the said tube or container body and the minimum diameter is at a point just below the ring 26. The scores 25c facilitate the crimping operation and after said operation the scores form small crimps or pleats 25h in the body of the container. The crimping operation forms an inclined shoulder 25f and the lower part of ring 26 seats against said shoulder. When the ring is beveled, the bevel 26b is at substantially the same angle as said shoulder. The crimping thus forms a seat for the ring and it would be impossible for the ring to be moved downward in the container body. The container body is also considerably strengthened at its top portion where it probably will be handled the most.

The small pleats or folds formed by scores 25c in the crimping operation run out into the cylindrical wall or periphery of the container a short distance above its smallest diameter and run out into said periphery a greater distance below said smallest diameter. The scores 25a, 25b, 25c and 25d can be made with any suitable tool which will make a fine crease in the paper stock. The crimping operation could be performed by placing the formed tube in a press or other surrounding member which can be forced inwardly.

Figure 18:
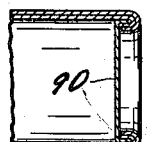
Fig. 18 is a central sectional view through the bottom portion of a finished container.
Figures 19, 20:
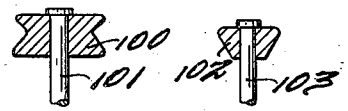
Fig. 19 is a central section through a wheel used in crimping and folding the bottom of the container.
Fig. 20 is a similar view through a wheel for compacting the folded end portion.
Figure 21:
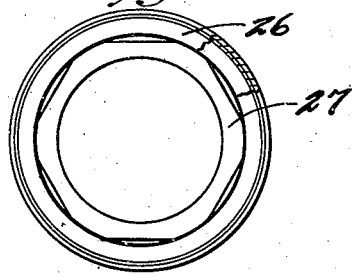
Fig. 21 is a view partly in end elevation and partly in transverse section of a mandrel with the container thereon and Fig. 22 is a partial vertical radial section through the bottom of the container.
Figure 22:
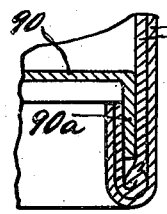

After the crimping operation the container is provided with a bottom and this is made in the form of a cup 90 having a peripheral cylindrical flange 90a (see Figs. 6 and 18). The inside of the container body or tube adjacent its bottom is provided with a layer 91 of adhesive and the periphery of flange 90a is preferably provided with adhesive. While the bottom 90 could be placed in the tube or container body by hand, it preferably is placed therein when carried upon a plunger as illustrated in said machine application. Adhesive 91 could be applied to the inside of the said tube by moving therein an adhesive-coated wheel 92 shown in Fig. 14 and rotated by a shaft 93. Adhesive could be applied to wheel 92 by an adhesive-applying wheel 94 carried on shaft 95, said wheel being partly disposed in a receptacle 96 containing adhesive. A plunger is moved toward the container bottom 25g coaxially therewith and the bottom 90 is thus moved into the end of said body on tube and will be firmly secured thereto by the adhesive. The end of the tube is then folded about flange 90a and this could be done by hand or by the use of a tool or wheel 100 carried on a shaft 101 shown in Fig. 19. In the said machine the end is folded over by such a wheel. After the end is thus folded over it is thus further smoothed and compacted. While this could be done by hand in any desired manner, it preferably is done by the use of a small wheel 102 carried on a shaft 103 operated by hand or in a machine as shown in said machine application. When the scores 25d are used and the contacting ends of the two layers are folded inwardly over flange 90a the inner layer will take the form shown in Fig. 22. The inner layer will fold partly about one score 25d closer to the edge of flange 90a and will fold about the other score 25d farther away from the edge of flange 90a. This method and structure is used so that the two layers of the material need not be separated and so that the terminal edges of the folded-in layers will be flush. Otherwise the outer layer would be disposed farther outwardly from the bottom of the container than the inner layer.

Alternately the bottom of the container could be folded inwardly as shown in Figs. 2 and 5. In this modification the lower edge portion of the blank is folded inwardly along a line parallel to its lower edge before being wound into the form of a tube.

Figure 8:
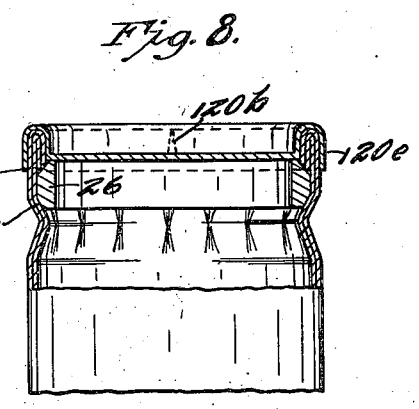
Fig. 8 is a view similar to Fig. 7 showing the container of Fig. 7 with the cover completed.
Figure 9:
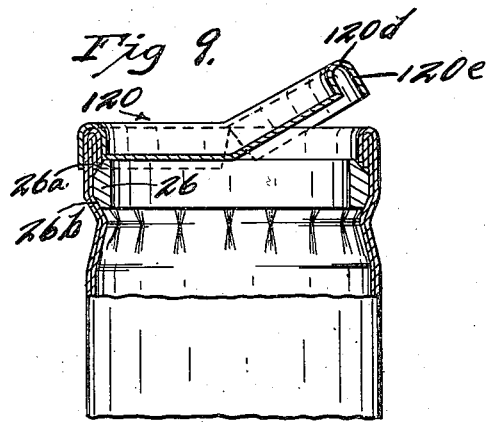
Fig. 9 is a view similar to Fig. 8 showing the cover partly lifted.
Figure 10:
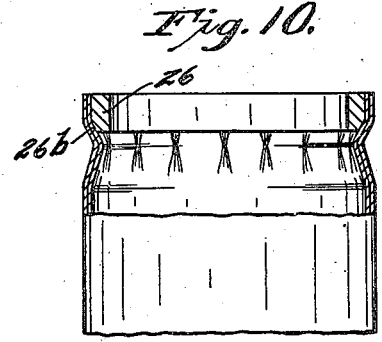
Fig. 10 is a view in central vertical section of the top portion of a modified form of container.
Figure 16:
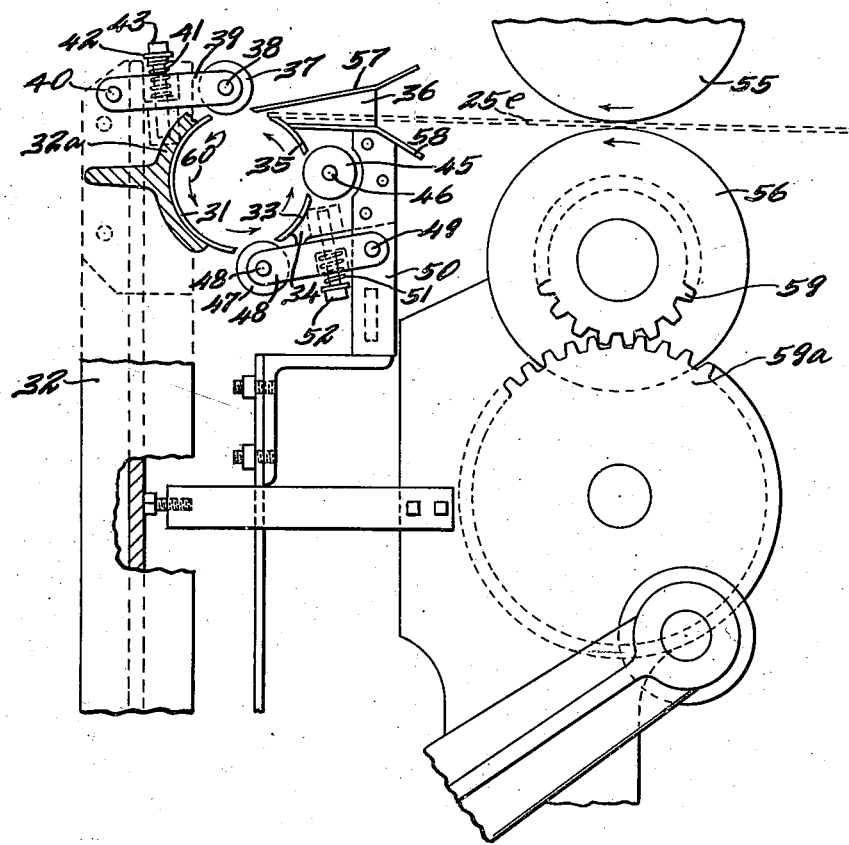
Fig. 16 is a view partly in side elevation and partly in vertical section of a portion of said machine.
Figure 17:
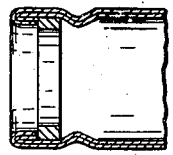
Fig. 17 is a vertical central section through the top of the finished container.

The top of the container is also preferably folded inwardly and when the ring 26 is provided with a bevel 26a the folded-in ends of the tube have their terminal edges disposed below the top of ring 26 or in line with the bevel 26a as shown in Figs. 7, 8 and 9. The top ends may also be folded as shown in Fig. 2 where each layer is folded in separately and the inner layer is at the outside of ring 26. Such structure is made by folding over the top portion of the blank along a line parallel to its top edge before the blank is wound about ring 26. The space between the layers at the top and bottom in such folded form as shown in Figs. 2, 4 and 5 is largely filled with adhesive. The top portion of the tube may also be folded inwardly as shown in Fig. 17 where the terminal ends of the inwardly folded sheets engage the top of ring 26. Where the container is to receive a plain cupped cap the container may be severed at its top portion flush with the top of ring 26 as shown in Fig. 10. As shown in Fig. 3 the vertical edges of the blank overlap some distance. The container thus has a four layer thickness at its top portion. This with the ring 26 and the crimped portion formed by the crimps give the container an exceedingly firm and strong structure.

In the said machine a portion of which is illustrated in Fig. 11, the container bodies were transferred from the mandrels or turret 30 to supporting members 110 on a second turret 111 intermittently rotated in the direction of arrows 112. The mandrels 27 on turret 30 and the members 110 on turret 111 come into coaxial alignment at one point as shown in Fig. 11. The finished container C is finally discharged from turret 111 into a suitable chute or receptacle 113. A gear 114 is shown as meshing with the gear 115 secured to turret 111. A receptacle 116 is shown adapted to contain adhesive which is applied by the roller 117 to the periphery of the rings 26.

All of said parts are described in the machine application referred to and it is believed any further description of the machine in this application is unnecessary. The machine parts herein are illustrated to show that the method could be carried out by suitable mechanism as well as by hand.

In Figs. 7 to 9 a cover is shown for the container. This cover is first made as a cup 120, having a peripheral flange 120a. V-shaped cuts or recesses 120b are preferably formed in said flange at diametrically opposite points. Preferably the end or disc portion of the cup 120 is provided with a score 120c extending thereacross on a diameter in line with the ends of cuts or recesses 120b. The cup 120 is positioned or forced into the upper end of the container into engagement with the top of ring 26. The edges thereof are then turned or folded downwardly and outwardly to form the part 120d which is semi-cylindrical in radial cross section and an external cylindrical flange 120e. The cover when in position on a container is as shown in Fig. 8. The cover can be lifted as shown in Fig. 9, the disc portion thereof then folding on score 120c. The cover could be raised somewhat to permit the contents of the container to be poured out or can be entirely removed by lifting one side as shown in Fig. 9.

From the above description it will be seen that we have provided a novel, very efficient and ingenious method of forming a container. The container has been formed of stiff paper material with a rigid ring 26 and a very strong durable and efficient container is produced. Such a container is very suitable for the delivery of liquid milk. It can also be used for any other liquid or other material such as cereals or other granular material. The container can be quickly made from a simple blank and the completed container is very strong and rugged. The container can be produced at a price to effect a great saving over the use of glass bottles now commonly used. When used for the usual daily dispensing of liquid milk, the container may be discarded after the milk has been used therefrom. The milk company is thus relieved of the necessity of collecting containers such as glass bottles and a great breakage loss now sustained with glass bottles would be eliminated. The container could be used with the simple disc cover now used with glass bottles, which disc would be forced into the container into contact with ring 26. When the cover shown in Figs. 7 to 9 is used, it can be quickly removed by simply inserting the thumb nail or finger nail over the folded edge of portion 20e. The cover then swings upwardly about the diametrical score and pivots or hinges about said score. The container is made from a simple blank and this can be easily and quickly prepared. The method of this invention has been amply demonstrated in actual practice and found to be very successful and efficient.

It will of course be understood that various changes may be made in the method and in the steps and sequence of steps of the same without departing from applicant's invention, which generally stated, consists in a method capable of carrying out the objects above set forth and such as described in the appended claims.

This application is a division of applicant's copending applications S. N. 334,384 and 394,136 above identified.

What is claimed is:

1. The method of forming a container which consists in providing a rigid member having an opening therethrough, placing said member upon a mandrel, rotating said mandrel to wind a sheet of flexible material about said member with the edges of said sheet respectively spaced from the sides of said ring to form a tube with said ring spaced from both ends thereof, placing a bottom in one end of said tube and folding the end of said tube inwardly at the outer side of said bottom.

2. The method of forming a container of general tubular form which consists in providing a rigid ring, winding a sheet of paper-like material about said ring in a plurality of layers with the edges of said sheet respectively spaced from the sides of said ring to form a tube having said ring spaced from the ends thereof, crimping said tube at the side of said ring spaced farther from one end thereof to reduce the diameter of said tube and form a shoulder against which said ring may seat and placing a bottom in one end of said tube.

3. The method of forming a tubular container body which comprises forming a blank of flexible material such as heavy paper and of substantially uniform width, scoring said blank with sets of spaced parallel scores extending transversely thereof and located adjacent one longitudinal edge of said blank, providing a rigid ring, placing said blank in position relatively to said ring so that said ring is adjacent the ends of said scores and has its sides spaced from the edges of said blank winding said blank about said ring to form a tube having said ring spaced from the ends thereof and crimping said tube to reduce the diameter thereof in alignment with said scores and at one side of said ring.

4. The method of forming a tubular container which comprises forming a sheet of paper blank of elongated form and substantially uniform width, scoring said blank with spaced parallel scores adjacent and parallel to one longitudinal edge thereof, scoring said blank with spaced scores extending between and at right angles to said scores, providing a rigid ring, winding said blank about said ring with said ring adjacent the ends of said last mentioned scores and spaced from the edges of said blank to form a tubular body having said ring spaced from the ends thereof and crimping said body and reducing the diameter thereof adjacent said ring at the zone of said scoring, whereby said last mentioned scores form crimps in said body.

5. The method of forming a tubular container which comprises forming a sheet of paper blank of elongated form and of substantially uniform width, scoring said blank with parallel spaced scores extending at right angles to one longitudinal edge thereof and near but spaced from said edge, scoring said blank with a pair of parallel longitudinally extending scores adjacent each longitudinal edge thereof, providing a rigid ring, locating said ring between the edges of said blank winding said blank on said ring to form a tube having said ring spaced from the ends thereof, crimping said body to reduce the diameter thereof in the zone of said first mentioned scores and adjacent said ring whereby said scores form crimps in said body, placing a bottom in one end of said tube and folding in the ends of said tube along said last mentioned scores.

6. The method of forming a tubular container body which comprises forming a sheet paper blank of general elongated rectangular form, scoring said blank with closely spaced parallel longitudinally extending scores adjacent its bottom edge, winding said blank on a mandrel to form a tubular body having inner and outer contacting layers with their bottom edges in a plane perpendicular to the axis of said body, placing a bottom member in said body having a cylindrical downwardly extending flange and folding both said inner and outer layers inwardly about said flange at said scores and forming a fold in said inner layer adjacent the edge of said flange and thus maintaining the edges of said layers in a plane extending at right angles to the axis of said body.

7. The method of forming a container of general tubular form which consists in providing a rigid ring winding a sheet of flexible material on said ring, with said material extending at both sides of said ring to form a tube with said ring spaced from the ends thereof and crimping said tube inwardly at one side of said ring to form a shoulder against which said ring may seat.

8. The method of forming a container of general tubular form which consists in placing a ring on a mandrel, the periphery of said ring being of greater diameter than the adjacent periphery of said mandrel, applying adhesive to the periphery of said ring, winding a sheet of flexible material about said ring in a plurality of layers to form a tube, with said ring spaced from both ends thereof, connecting said layers by adhesive, and contracting said tube adjacent one side of said ring to form a shoulder against which said ring may seat.

9. The method of forming a container of general tubular form which consists in locating a sheet of flexible material having substantially parallel edges relatively to a ring so that the sides of said ring are spaced from said edges respectively, winding said sheet about said ring so that said sheet engages and is supported by said ring to form a tube having said ring spaced from the ends thereof and contracting said tube close to one side of said ring to form a shoulder against which said ring seats.

JOHN G. O'NEIL.
LAWRENCE G. ZESBAUGH.